(12) United States Patent
Shingler et al.

(10) Patent No.: US 10,542,840 B2
(45) Date of Patent: Jan. 28, 2020

(54) CONTINUOUS COOKING SURFACE WITH INDIVIDUALLY CONTROLLABLE HEATING ZONES

(71) Applicant: Evo, Inc., Beaverton, OR (US)

(72) Inventors: Robert A. Shingler, Beaverton, OR (US); Joseph R. Shaw, Beaverton, OR (US)

(73) Assignee: Evo, Inc., Tualatin, OR (US)

( * ) Notice: Subject to any disclaimer, the term of this patent is extended or adjusted under 35 U.S.C. 154(b) by 183 days.

(21) Appl. No.: 15/365,487

(22) Filed: Nov. 30, 2016

(65) Prior Publication Data

US 2018/0146822 A1    May 31, 2018

(51) Int. Cl.
*A47J 37/06*    (2006.01)

(52) U.S. Cl.
CPC ............. *A47J 37/06* (2013.01); *A47J 37/067* (2013.01); *A47J 37/0676* (2013.01)

(58) Field of Classification Search
CPC ....... A47J 37/067; A47J 37/0676; A47J 37/06
USPC .......................................... 99/422, 425, 444
See application file for complete search history.

(56) References Cited

U.S. PATENT DOCUMENTS

| | | | |
|---|---|---|---|
| 2,696,162 A * | 12/1954 | Michaelis | A47J 37/0676 126/214 R |
| 3,713,380 A * | 1/1973 | Bardin | A47J 37/10 99/422 |
| 4,369,763 A * | 1/1983 | Sullivan | A47J 36/26 108/50.18 |
| 5,676,043 A | 10/1997 | Best | |
| 5,964,145 A * | 10/1999 | Brown | A47J 37/1261 126/39 J |
| 7,921,842 B2 * | 4/2011 | Lee | A47J 36/025 126/25 R |
| 2005/0000957 A1 | 1/2005 | Jones et al. | |
| 2009/0050131 A1 | 2/2009 | Lee | |
| 2010/0154655 A1 * | 6/2010 | Mehta | A47J 37/067 99/425 |

(Continued)

FOREIGN PATENT DOCUMENTS

EP    1946685    *    7/2008    ............ A47J 37/067

OTHER PUBLICATIONS

ISA United States Patent and Trademark Office, International Search Report and Written Opinion Issued in PCT Application No. PCT/US17/58865, dated Mar. 1, 2018, WIPO, 10 pages.

(Continued)

*Primary Examiner* — Reginald Alexander
(74) *Attorney, Agent, or Firm* — Alleman Hall Creasman & Tuttle LLP

(57) ABSTRACT

Examples are disclosed herein that relate to a grill with a continuous cooking surface having individually controllable heating zones separated by one or more isolation zones. One example provides a grill, comprising a continuous cooking surface comprising a plurality of individually controllable heating zones separated by one or more isolation zones, each heating zone comprising a heating zone plate with one or more heating elements disposed beneath the heating zone plate, and each isolation zone comprising an isolation bar joined to adjacent conductive plates of adjacent heating zones, each isolation bar comprising a cooling channel extending at least partially along a length of the isolation bar.

18 Claims, 5 Drawing Sheets

(56) References Cited

U.S. PATENT DOCUMENTS

| | | |
|---|---|---|
| 2010/0199857 A1 | 8/2010 | Storiz et al. |
| 2014/0161952 A1 | 6/2014 | Sykes |
| 2014/0161953 A1 | 6/2014 | Jones et al. |
| 2017/0223772 A1 | 8/2017 | Shingler |

OTHER PUBLICATIONS

ISA Korean Intellectual Property Office, International Search Report and Written Opinion Issued in Application No. PCT/US2019/031784, dated Aug. 23, 2019, WIPO, 12 pages.

* cited by examiner

CONTINUOUS COOKING SURFACE WITH INDIVIDUALLY CONTROLLABLE HEATING ZONES

BACKGROUND

A grill may include a continuous cooking surface heated by one or more heating elements positioned beneath the cooking surface.

SUMMARY

Examples are disclosed herein that relate to a grill with a continuous cooking surface having individually controllable heating zones. One example provides a grill comprising a continuous cooking surface having a plurality of individually controllable heating zones separated by one or more isolation zones. Each heating zone comprises a heating zone plate with one or more heating elements disposed beneath the heating zone plate, each isolation zone comprises an isolation bar joined to adjacent heating zone plates, and each isolation bar comprises a cooling channel extending at least partially along a length of the isolation bar.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a grill may include a continuous cooking surface with one or more heating elements positioned beneath the cooking surface to heat the cooking surface. In some situations, it may be desirable to cook foods at different temperatures on the same cooking surface. For example, a person may wish to reduce a sauce or soup in a pot or pan at a higher temperature, then simmer the sauce or soup at a lower temperature. When using a grill with a single temperature control, the person may first place the pot or pan closer to an outside edge of the grill, and then move the pot or pan to the middle, as heating element positioning and heat transfer characteristics may cause the cooking surface temperature to decrease toward the outside edge. As another example, a person may wish to simultaneously cook meats and vegetables on the same grill at different temperatures, and thus the person may cook vegetables closer to the outside edge of the grill while cooking meats closer to the middle. However, the temperature in the cooler region may not be easily controllable or measurable in such an arrangement.

Some grills may include individually controllable heating elements for different heating zones of the continuous cooking surface, which may provide more control over the temperatures of different regions of the continuous cooking surface. However, as the materials from which the cooking surfaces are made are good thermal conductors, it may be difficult to maintain the temperatures of different heating zones at desired levels, particularly with large temperature differentials, due to the transfer of heat between regions.

Accordingly, examples are disclosed herein that relate to a cooking system having a continuous cooking surface comprising heating zones that may be more easily maintained at different temperatures. The individual heating zones of the continuous cooking surface are separated by one or more isolation zones incorporated into the continuous cooking surface. Such isolation zones may include cooling features to facilitate air or fluid-assisted cooling, thereby helping to lessen the conduction of heat between adjacent heating zones. Further, as the cooking surface is continuous, food may be easily moved between cooking surface by sliding the food from one heating zone to another.

Figure 1:
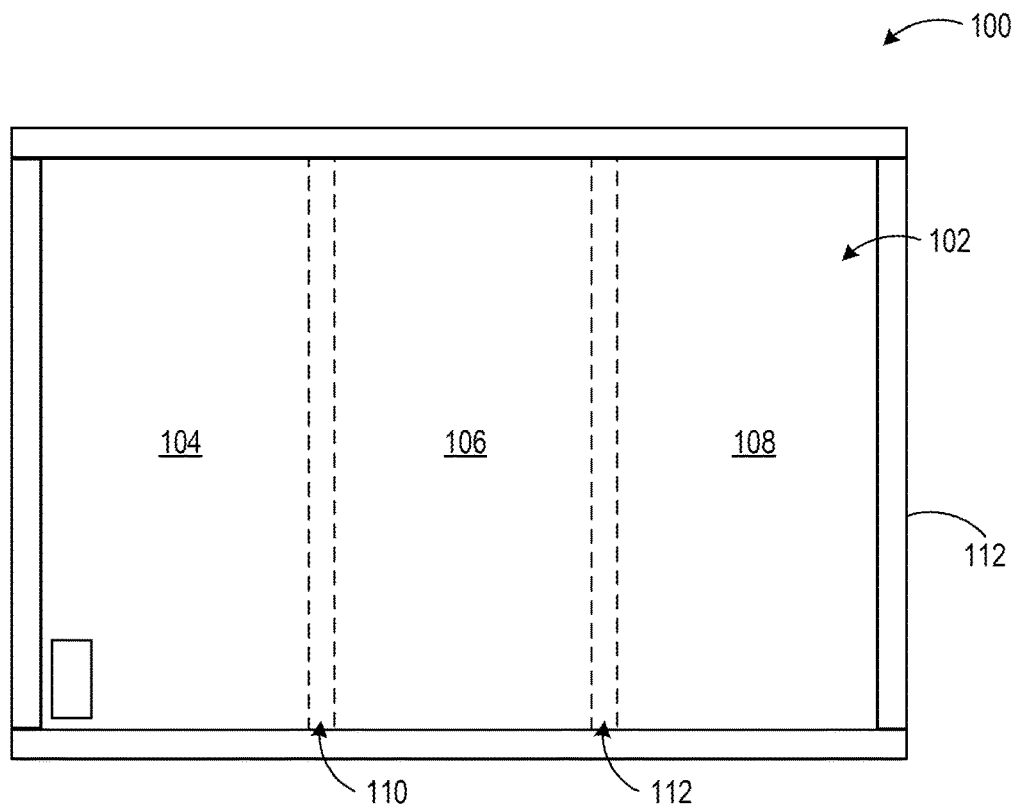
FIG. 1 shows a top view of an example grill comprising a continuous cooking surface with individually controllable heating zones separated by isolation zones.

FIG. 1 schematically shows a top view of an example cooking system 100 having a continuous cooking surface 102 segmented into three heating zones 102, 104, and 106 by isolation zones 108 and 110. Heating zones 102, 104 and 106 have individually controllable heating elements, such that each heating zone can be set at a different temperature relative to adjacent heating zones, whether higher or lower. While heating zones and two isolation zones are shown, a cooking system may have any other suitable number of heating zones and cooling zones. FIG. 1 also illustrates a flange 112 surrounding the cooking surface, e.g. to help contain food from spilling over an edge of the cooking surface 102.

Figure 2:
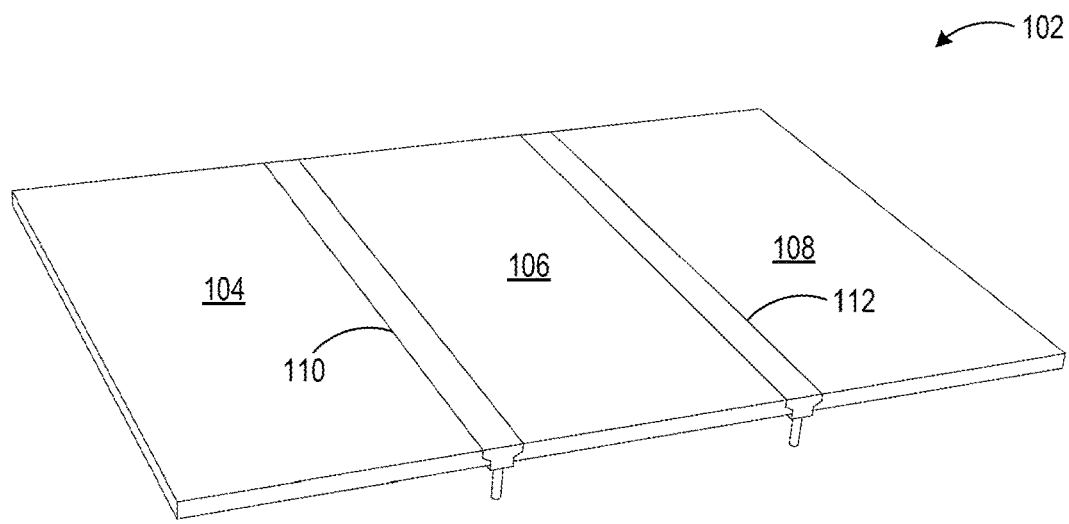
FIG. 2 shows a perspective view of the continuous cooking surface of the grill of FIG. 1.

FIG. 2 shows a perspective view of the cooking surface 102. The isolation zones 108 and 110 take the form of isolation bars joined to adjacent heating plates of adjacent heating zones, such that upper surfaces of the isolation bars and heating plates form the continuous cooking surface.

Figure 3:
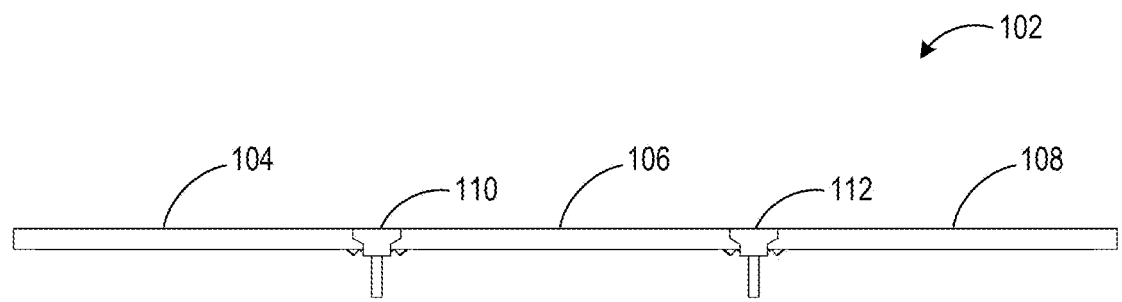
FIG. 3 shows a side view of the continuous cooking surface of the grill of FIG. 1.

FIG. 3 shows a side view of the cooking surface 102. As depicted, the upper surfaces of isolation bars 110 and 112 are level with the upper surfaces of heating zones 104, 106, and 108 to form a level, continuous surface across which food and/or cookware can be easily moved. The heating zones 104, 106 and 108 and the isolation bars 110, 112 may be formed from any suitable material(s). In some examples, the heating zones 104, 106, and 108 comprise thermally conductive plates formed from steel. The thermally conductive plates may have any suitable thickness, including but not limited to thicknesses between 0.5 and 1 inch. The isolation bars 110, 112 may be formed from a same material as the heating zone plates, or from a different material than adjacent heating zone plates, such as a material having a lower thermal conductivity than the heating zone plates.

Figure 4:
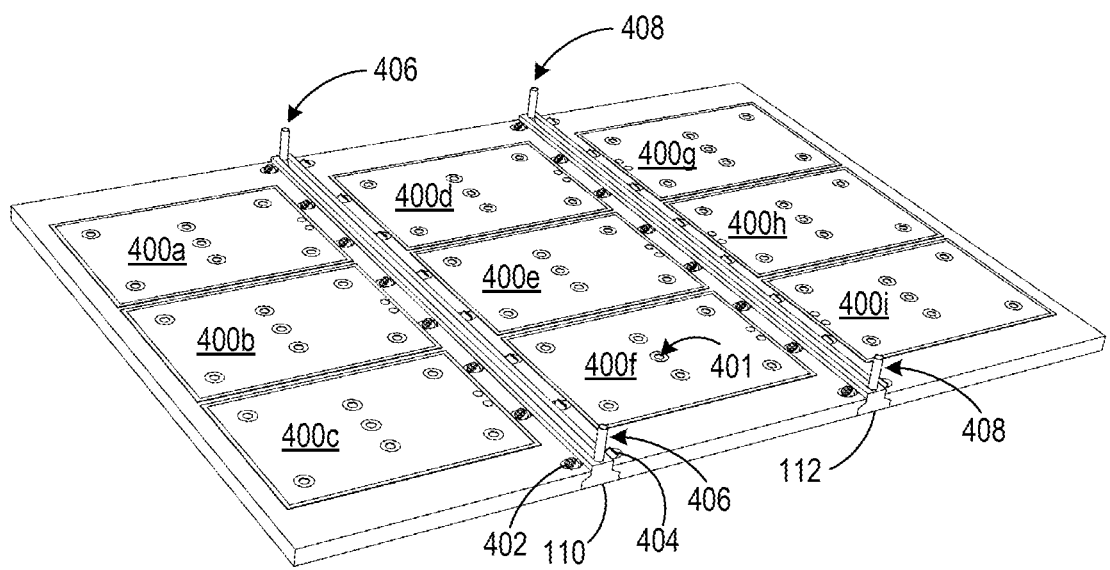
FIG. 4 shows a bottom perspective view of the continuous cooking surface of the grill of FIG. 1.

FIG. 4 shows a bottom view of the cooking surface 102, and illustrates an example arrangement of heating elements 400 for each heating zone. In the depicted example, the cooking system comprises three heating elements for each heating zone, for a total of nine heating elements 400a-i. The heating elements may utilize any suitable heating mechanism. For example, the depicted heating elements may comprise resistive heating elements formed from an etched resistive foil located between insulating layers. In other examples, any other suitable number, size, and arrangement of heating elements of any suitable shape/size/heating mechanism may be used.

In the depicted example, each heating element 400 includes a hole 401 to accommodate a temperature sensor (e.g. a thermocouple) for monitoring temperature of the heating plate above the heating element. In other examples, any other suitable arrangement of temperature sensors may be used such as fewer temperature sensors than heating elements per heating zone, or more than one temperature sensor per heating element. In the depicted example, each heating element further includes six holes to accommodate fasteners for fastening the heating element to a cooking surface. In other examples, any other arrangement of and/or type of attachment points for fasteners may be used. Another example arrangement in which only a single attachment point is utilized to fasten each heating element to the cooking surface is described below with regard to FIG. 8.

Signals from each of the temperature sensors may be sent to a temperature controller to allow independent control of each heating element based on the sensed temperatures. For example, the controller may be configured to automatically provide more or less power to one or more heating elements underneath a heating zone to maintain the temperature of that heating zone at a set temperature.

Figure 5:
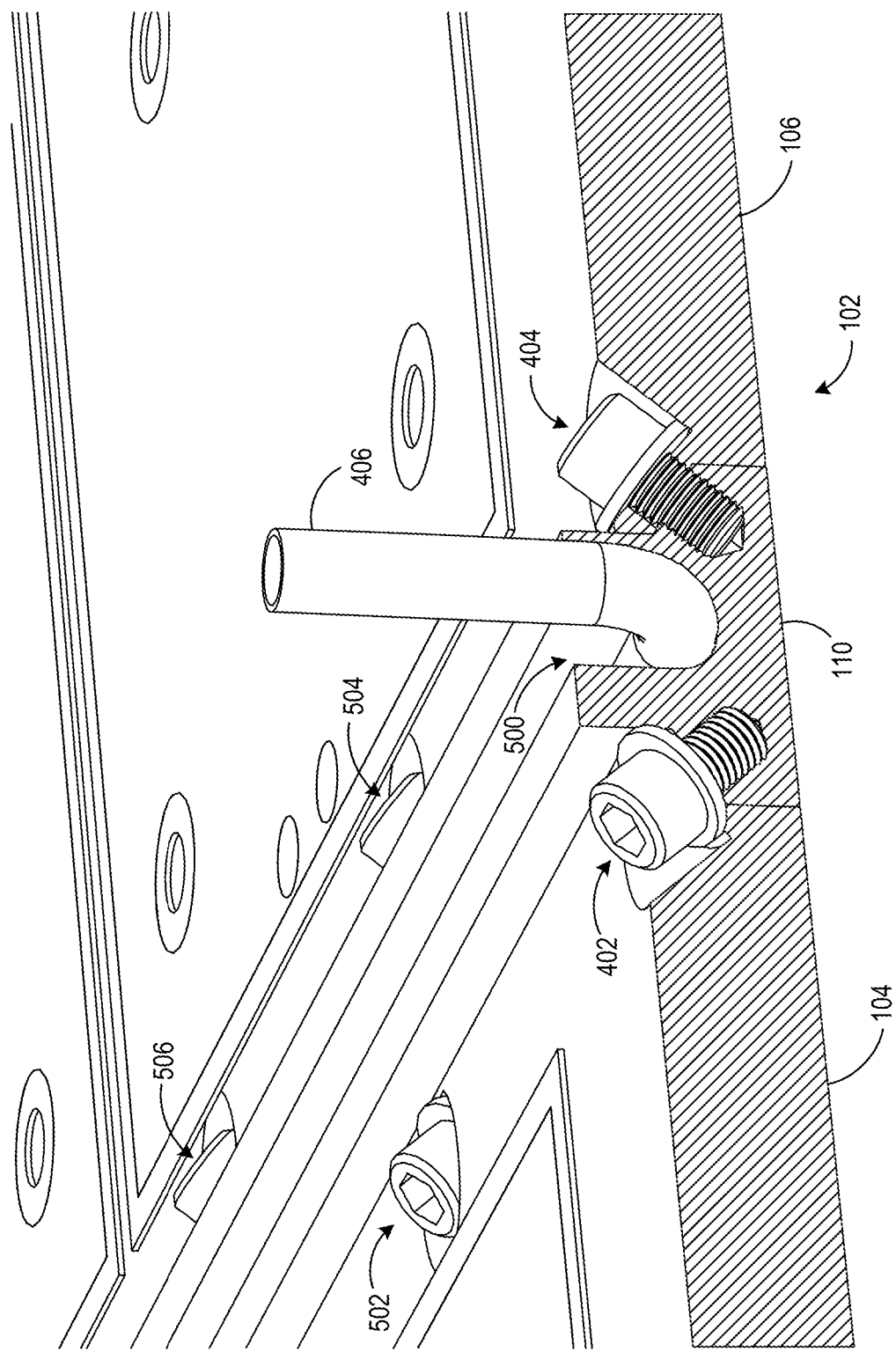
FIG. 5 shows a sectional view of the continuous cooking surface of the grill of FIG. 1.

Each isolation bar 110, 112 may be secured to adjacent conductive plates in any suitable manner. FIGS. 4 and 5 show one example in the form of bolts, two of which are indicated at 402 and 404. In other examples, other suitable fasteners may be used. Referring to FIG. 5, each bolt is angled with respect to a plane of the cooking surface 102. This arrangement may help to provide for a suitably tight connection of each isolation bar to adjacent conductive plates. In other examples, any other suitable fasteners may be utilized to join each isolation bar to adjacent conductive plates.

Figure 6:
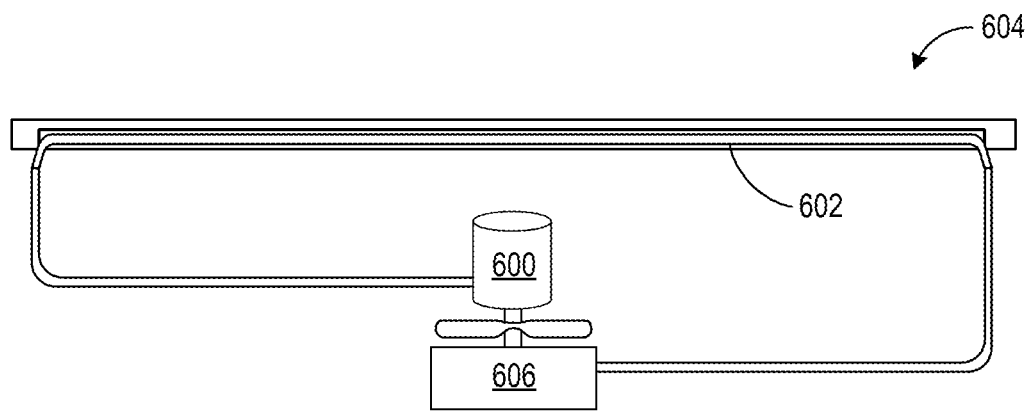
FIG. 6 shows a schematic diagram of an example cooling system for cooling an isolation bar.

Each isolation bar may have any suitable structure that helps lessen heat transfer between heating zones. In the depicted embodiment, each isolation bar includes a cooling channel that takes the form of a recess in an underside of the isolation bar that extends at least partially along a length of the isolation bar. In other examples, the cooling channel may take the form of a bore formed at least partially through a length of the isolation bar, as opposed to a recess in an underside of the isolation bar. In the depicted example, each cooling channel accommodates a cooling fluid conduit, such as a tube 406 and 408 for each of isolation bars 110 and 112, respectively. FIG. 5 shows a closer, detailed cutaway view of the isolation bar 110 including cooling channel 500 in which conduit 406 is positioned. Though shown herein as a U-shaped channel, a cooling channel may take any other suitable shape and may be formed along any suitable length of each isolation bar. Further, in other examples, the cooling channel may facilitate air cooling by increasing a surface area of the cooling channel in contact with ambient air or a flow of air from a fan or other blower, as opposed to accommodating a cooling fluid conduit. In other examples, cooling channels may be formed along the top sides or lateral sides of the isolation bars, rather than in the undersides or as a borehole through an interior region. In yet other examples, one or more isolation bars may not include cooling channels, and may instead rely on different thermal conductivities of each heating zone plate to provide suitable thermal isolation.

Where a cooling fluid is used as a part of a cooling system for the isolation bars of a cooling surface, the cooling system further may include a pump configured to move a cooling fluid through the cooling fluid conduit in each isolation bar. FIG. 6 schematically shows an example pump 600 that moves a cooling fluid through the conduit 602 of an isolation bar 604. Any suitable cooling fluid may be pumped through the isolation bars, including but not limited to water and glycol-based coolants, a compressed refrigerant, or air. An air-cooled radiator 606 may help to cool the coolant after the coolant travels through the isolation bar 604. In other examples, any other suitable cooling techniques may be utilized.

Figure 7:
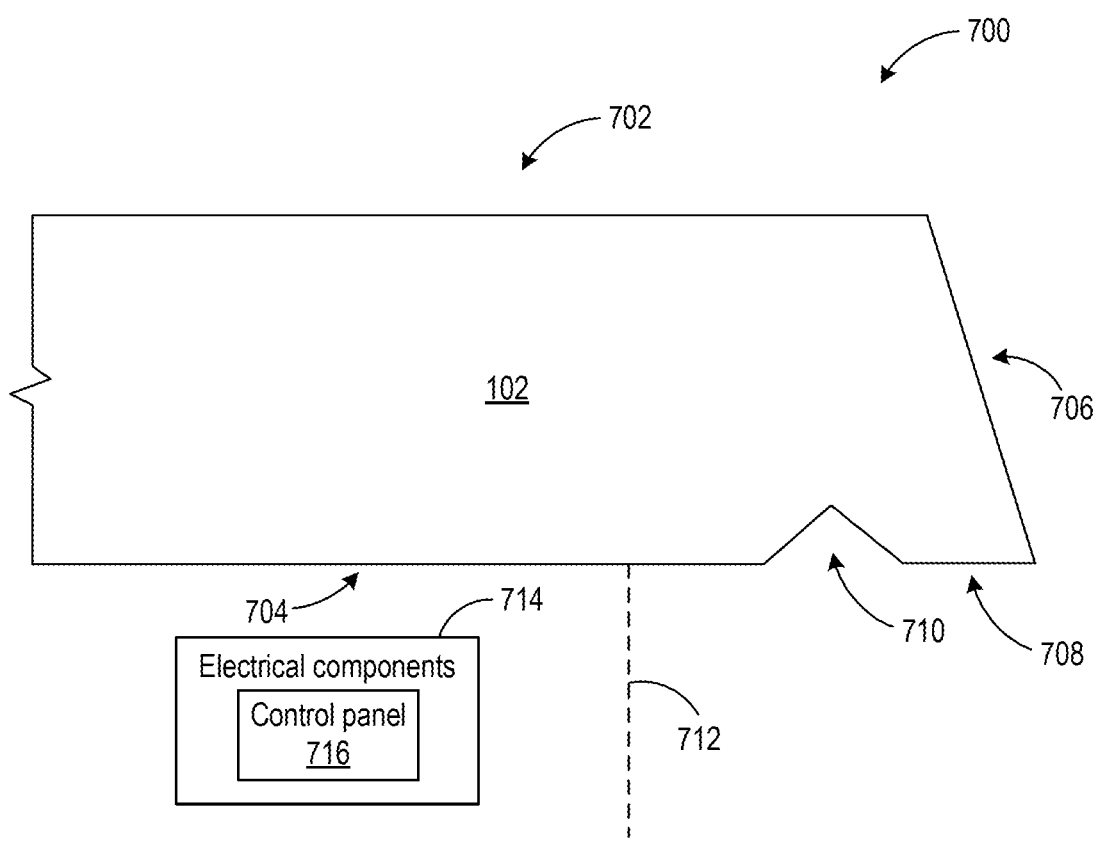
FIG. 7 shows an example edge configuration for a continuous cooking surface.

In some examples, the cooking surface may be suspended above a supporting base structure, e.g. a body 712 or other structure, where a portion of the cooking surface perimeter extends beyond the base structure. Further, the perimeter of the cooking surface extending beyond this base structure may include elements that help to prevent oil and other liquids from dripping down an edge of the cooking surface and migrating to an underside of the cooking surface. FIG. 7 shows a side view of an example configuration of an edge 700 of the cooking surface 102, illustrating the top surface at 702, the underside 704, and an outside edge 706. The outside edge 706 may be straight or may be angled to any suitable degree, either outward as shown, or inward in other examples. The edge 700 also includes a drip edge 708 that extends between the bottom of the outside edge 706 and a drip channel 710. The drip channel 710 may be formed in the underside 704 in an angled shape, as shown, or in any other suitable shape (e.g. circular), nearby the outside edge 706. Such a drip channel may be formed along each outside edge of the cooking surface 102. Oils and liquids from the top surface 702 that fall down the outside edge 706 may follow the drip edge 708 to the drip channel 710. The drip channel 710 may cause such oils and liquids to pool and fall down vertically from the channel, and thus help to prevent further movement of oils and liquids along the underside 704 toward a body of the grill, represented by dashed line 712, which may be damaging to electrical heating elements and other components that may be attached to the underside 704 of the cooking surface 102, or electrical components 714 on or within the body 712.

In additional examples, the grill may include a control panel 716 to allow control of various functions of the grill, such as the control of the temperature of the cooking surface, either as a whole or separately for each heating zone. User input may control the power supplied by a solid state relay for each heating element of a heating zone. The control panel 716 may further be configured to provide visual feedback, for example, to show a current temperature of each heating zone, as measured by the installed thermocouples. As an example, dynamic offsets may be utilized between each heating zone to calculate the actual surface temperature from the temperature as measured by the thermocouples, as the thermocouple measurements of the underside of the cooking surface may differ from actual surface temperatures. The control panel 716 may utilize any suitable user input devices, including but not limited to buttons, knobs, and one or more touch sensitive displays. Likewise, the control panel 716 may include any suitable display devices, including but not limited to light-emitting diodes, liquid crystal displays, and organic light emitting devices.

Figure 8:
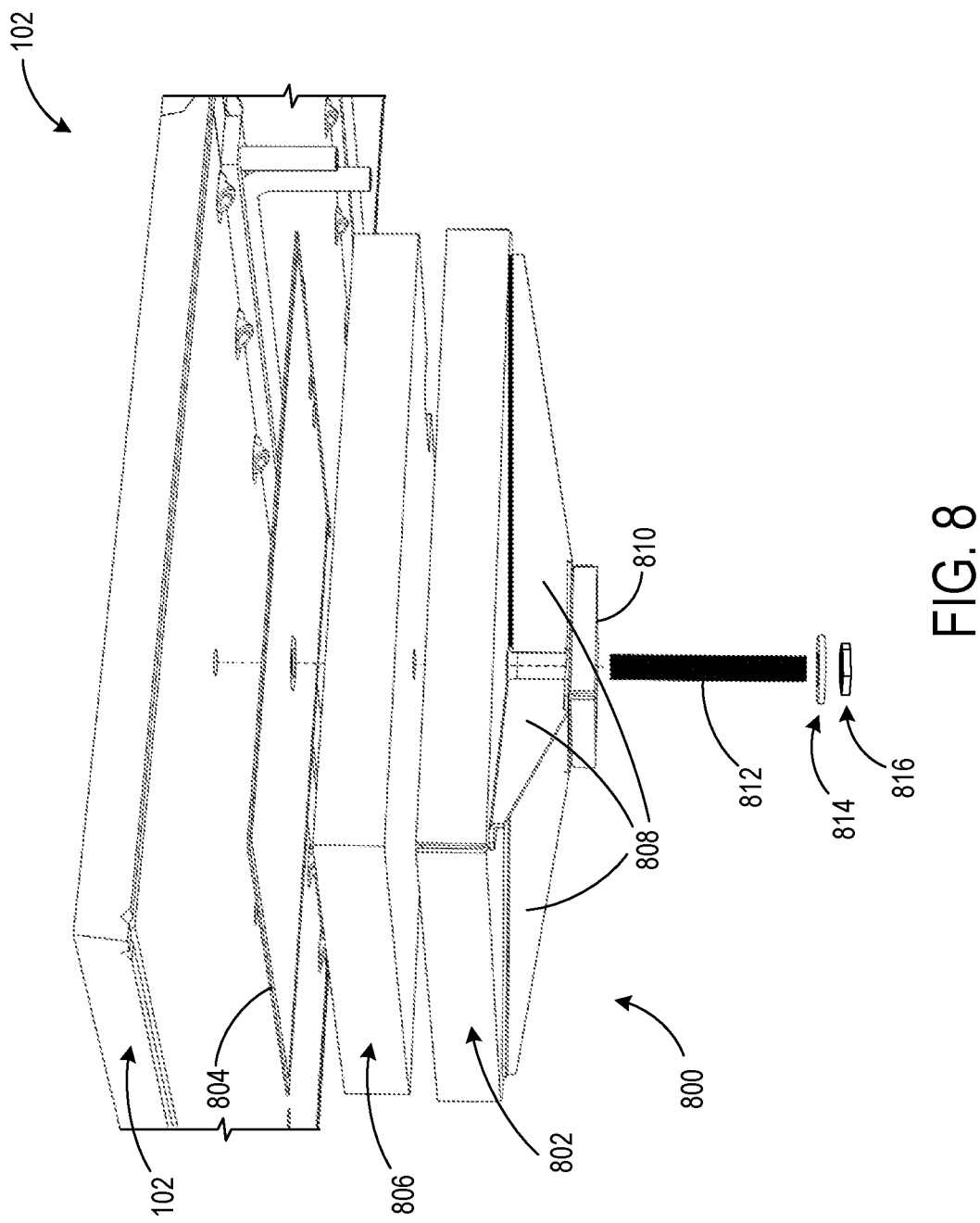
FIG. 8 shows an example heater compression plate assembly.

FIG. 8 shows an example heater compression plate assembly 800 having a cassette 802 for securing a heating element 804 and an insulating refractory brick 806 against the underside of the cooking surface 102. In this example, the heating element 804 may be attached to the cooking surface 102 at a single location. Such a compression method may allow for the more convenient attachment of the heating element 804 to the underside of the cooking surface 102 than other methods (e.g. welding) and may help to increase the watt density and efficiency of the heating element 804. The cassette 802 may be reinforced with longitudinal support structures 808 extending from a middle portion of the cassette 802 to the outer corners. Other distributed compression support structures also may be used, such as a suitably shaped washer 810. The cassette 802 may be secured and compressed to an underside of the cooking surface 102 by a threaded collar 812, washer 814, and nut 816, or by any other suitable attachment mechanism. A thermocouple may be inserted through the threaded collar 812, and into the underside of the cooking surface 102 to sense a temperature of the cooking surface 102 at that location, as mentioned above. It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A grill, comprising:
    a continuous cooking surface comprising a plurality of individually controllable heating zones separated by one or more isolation zones,
        each heating zone comprising a heating zone plate with one or more heating elements disposed beneath the heating zone plate, and
        each isolation zone comprising an isolation bar joined to adjacent heating zone plates, each isolation bar comprising a cooling channel extending at least partially along a length of the isolation bar, and each isolation bar comprising an upper surface that forms a portion of the continuous cooking surface.

2. The grill of claim 1, further comprising a cooling system configured to move a cooling fluid through the cooling channel.

3. The grill of claim 2, wherein the cooling fluid comprises water.

4. The grill of claim 2, wherein the cooling fluid comprises a glycol-based coolant.

5. The grill of claim 2, wherein the cooling system comprises a pump configured to pump the cooling fluid through the cooling channel of each isolation zone.

6. The grill of claim 1, wherein the cooling channel of each isolation zone is configured to facilitate air cooling.

7. The grill of claim 1 wherein each isolation zone comprises a cooling fluid conduit positioned within the cooling channel.

8. The grill of claim 1, further comprising a pump configured to pump a cooling fluid through the cooling channel of one or more isolation zones.

9. The grill of claim 1, wherein the isolation bar of each isolation zone is formed from a different material than adjacent heating zone plates.

10. The grill of claim 1, wherein each isolation bar is joined to adjacent heating zone plates via one or more fasteners.

11. The grill of claim 10, wherein each fastener is angled with respect to a plane of the continuous cooking surface.

12. The grill of claim 1, wherein one or more heating elements of a first heating zone are independently controllable relative to one or more heating elements of a second heating zone.

13. The grill of claim 1, further comprising a drip channel formed in an underside of the continuous cooking surface, the drip channel configured to prevent liquid from reaching electrical components of the grill.

14. The grill of claim 1, further comprising a heating compression plate configured to compress each heating element to an underside of the continuous cooking surface via a threaded fastener, wherein the threaded fastener is configured to accommodate a temperature sensor.

15. A grill, comprising:
    a continuous cooking surface comprising a plurality of individually controllable heating zones separated by one or more isolation zones,
        each heating zone comprising a heating zone plate with one or more heating elements disposed beneath the heating zone plate, and
        each isolation zone comprising an isolation bar joined to adjacent heating zone plates, each isolation bar comprising a cooling channel, and each isolation bar comprising an upper surface that forms a portion of the continuous cooking surface with the heating zone plates; and
    a cooling system configured to move a cooling fluid through each cooling channel.

16. The grill of claim 15, wherein each isolation zone is formed from a different material as adjacent heating zone plates.

17. The grill of claim 15, wherein each isolation zone further comprises a cooling fluid conduit positioned within the cooling channel.

18. The grill of claim 15, wherein the cooling system comprises a pump configured to pump the cooling fluid through each cooling channel.

* * * * *